United States Patent
Bernal et al.

(10) Patent No.: US 7,711,730 B2
(45) Date of Patent: May 4, 2010

(54) METHOD OF RETURNING DATA DURING INSERT STATEMENT PROCESSING

(75) Inventors: Margaret A. Bernal, San Jose, CA (US); Karelle L. Cornwell, Campbell, CA (US); Hsuiying Y. Cheng, Fremont, CA (US); Yao-Ching S. Chen, Saratoga, CA (US); Christopher J. Crone, San Jose, CA (US); Fen-Ling Lin, San Jose, CA (US); James W. Pickel, Gilroy, CA (US); Yumi K. Tsuji, San Jose, CA (US); Julie A. Watts, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 383 days.

(21) Appl. No.: 10/744,633

(22) Filed: Dec. 22, 2003

(65) Prior Publication Data

US 2005/0138010 A1 Jun. 23, 2005

(51) Int. Cl.
*G06F 7/00* (2006.01)
*G06F 17/30* (2006.01)
(52) U.S. Cl. ...................................... 707/718
(58) Field of Classification Search .................. None
See application file for complete search history.

(56) References Cited

U.S. PATENT DOCUMENTS

| | | | |
|---|---|---|---|
| 5,590,321 A | 12/1996 | Lin et al. .................... 395/610 |
| 6,003,022 A | 12/1999 | Eberhard et al. ............... 707/2 |
| 6,148,296 A | 11/2000 | Tabbara ......................... 707/3 |
| 6,349,310 B1 * | 2/2002 | Klein et al. ................. 707/200 |
| 6,453,314 B1 | 9/2002 | Chan et al. ..................... 707/3 |
| 6,460,027 B1 | 10/2002 | Cochrane et al. .............. 707/2 |
| 6,493,710 B1 | 12/2002 | Gollapudi et al. .............. 707/4 |
| 6,581,055 B1 * | 6/2003 | Ziauddin et al. ............... 707/4 |
| 6,895,013 B1 * | 5/2005 | Burns et al. ................. 370/401 |

(Continued)

OTHER PUBLICATIONS

Cochrane, Roberta J. et al., "Optimizing Correlated Queries Using Automatic Summary Tables," U.S. Appl. No. 09/502,821, filed Feb. 11, 2000, pp. 1-56.
Cochrane, Roberta J. et al., "Optimizing Queries Using Automatic Summary Tables," pp. 1-126.

(Continued)

*Primary Examiner*—Charles Rones
*Assistant Examiner*—Alicia M Lewis
(74) *Attorney, Agent, or Firm*—Sawyer Law Group P.C.

(57) ABSTRACT

A method for generating an execution plan for updating and retrieving data from a database in a single process includes: receiving a statement by a server to update a database with a first set of data and to retrieve a second set of data from the database; building a first execution plan to update the database with the first set of data; building a second execution plan to retrieve the second set of data from the database; and building a single execution plan including a combination of the first and second execution plans. The single execution plan allows for the updating and retrieval of data with a single crossing of an interface between a client and the database. By performing both functions in this manner, the efficiency of performing such tasks on the database is significantly increased.

23 Claims, 7 Drawing Sheets

U.S. PATENT DOCUMENTS

| | | | |
|---|---|---|---|
| 2002/0038313 A1* | 3/2002 | Klein et al. | 707/200 |
| 2002/0087561 A1 | 7/2002 | Ching Chen et al. | 707/100 |
| 2002/0174108 A1 | 11/2002 | Cotner et al. | 707/3 |
| 2003/0004930 A1 | 1/2003 | Minder et al. | 707/2 |
| 2003/0014397 A1 | 1/2003 | Chau et al. | 707/3 |
| 2003/0037039 A1 | 2/2003 | Mah et al. | 707/1 |
| 2003/0088558 A1 | 5/2003 | Zaharioudakis et al. | 707/3 |
| 2005/0177550 A1* | 8/2005 | Jacobs et al. | 707/1 |

OTHER PUBLICATIONS

Cochrane, Roberta J. et al., "Optimizing Correlated Queries Using Automatic Summary Tables," pp. 1-56.

Haas, Laura M. et al., "Extensible Query Processing in Starburst," IBM Almaden Research Center, San Jose, CA, pp. 377-388.

Wang, Haixun et al., "ATLaS: A Native Extension of SQL for Data Mining Stream Computations," pp. 1-24.

* cited by examiner

METHOD OF RETURNING DATA DURING INSERT STATEMENT PROCESSING

FIELD OF THE INVENTION

The present invention relates to relational database management systems, and more particularly, to the update and retrieval of data from relational databases by the management systems.

BACKGROUND OF THE INVENTION

Distributed relational database management systems (RDMS) are well known in the art. FIG. 1 illustrates a conventional RDMS. The system includes a client 101 running an application 102, where the client 101 is coupled to a server 104 via a network 103. The server 104 includes a database engine 105, which in turn includes a query processor 106 and a data manager 107. The server 104 manages access to the database 108 by the application 102 at the client 101. Typically, Structured Query Language (SQL) queries are used to issue task requests on the database 108. The query processor 106 processes and executes these queries or statements, accessing the database 108 via the data manager 107, utilizing application programming interfaces (API).

When data in the database 108 is to be updated, the application 102 sends one or more SQL statements across the network 103 to the server 104. For example, INSERT, UPDATE, or DELETE statements may be used. Data in one or more rows of the database 108 are then inserted, updated, or deleted. Sometimes, the database 108 generates values in one or more columns in the row(s) as well. For example, a row pertaining to a sale is inserted, with values in the customer name column, payment information column, and items purchased column. The database then also inserts a timestamp in a fourth column in the same row. The database updates additional columns based on the definition of columns in the table. Values updated by a user can also be modified due to database constraints or due to triggers on the database table.

For a user to know what values were actually written to disk, separate SQL statements must be issued to fetch the data in the updated row(s), such as a SELECT statement. This requires the building of a separate execution plan for each SQL statement, and requires multiple crossings of the data manager 107. As is known in the art, an execution plan outlines how a server's query processor will actually run a specific query or statement. The query processor 106 parses and optimizes the SQL statement and generates the execution plan. The plan is then executed, using the data manager 107 to manipulate the data. These multiple API crossings between the client 102, server 104, query processor 106, and data manager 107 are inefficient. In some cases, for example, when the database generates a primary key, the only unique value in the data is the generated value. In these cases, it is not possible to retrieve the data that had just been inserted into the table since the primary key is not known by the application.

Accordingly, there exists a need for a method for generating an execution plan for updating and retrieving data from a database in a single process. The method should allow a single statement to be issued for data to be updated and retrieved from the database. The execution plan for the statement should require a single API crossing between the client and the database. The present invention addresses such a need.

SUMMARY OF THE INVENTION

A method for generating an execution plan for updating and retrieving data from a database in a single process includes: receiving a statement by a server to update a database with a first set of data and to retrieve a second set of data from the database; building a first execution plan to update the database with the first set of data; building a second execution plan to retrieve the second set of data from the database; and building a single execution plan including a combination of the first and second execution plans. The single execution plan allows for the updating and retrieval of data with a single crossing of an interface between the client and the database. By performing both functions in this manner, the efficiency of performing such tasks on the database is significantly increased.

DETAILED DESCRIPTION

The present invention provides a method for generating an execution plan for updating and retrieving data from a database in a single process. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 2 through 7 in conjunction with the discussion below.

Figure 1:
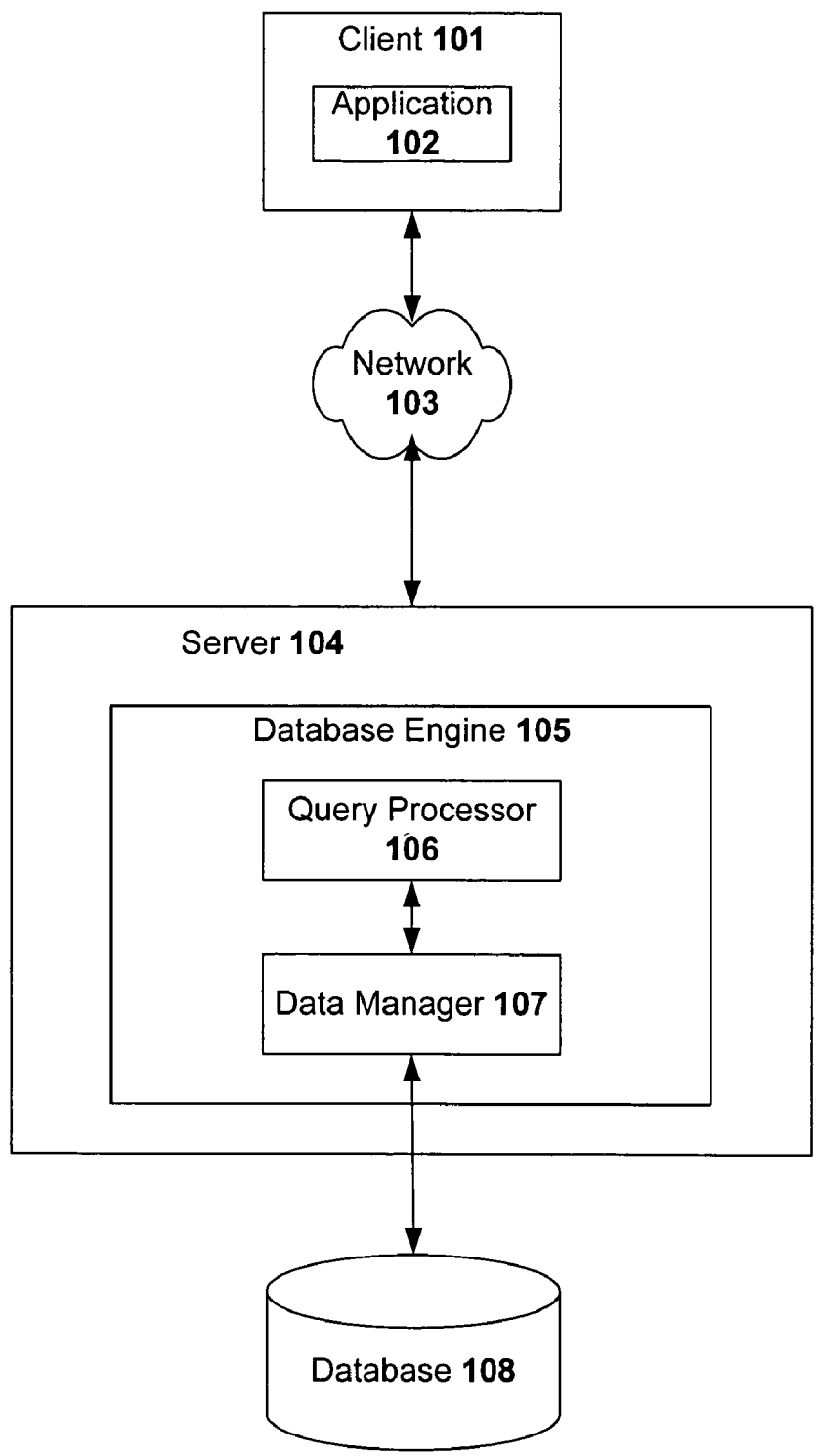
FIG. 1 illustrates a conventional relational database management system.
Figure 2:
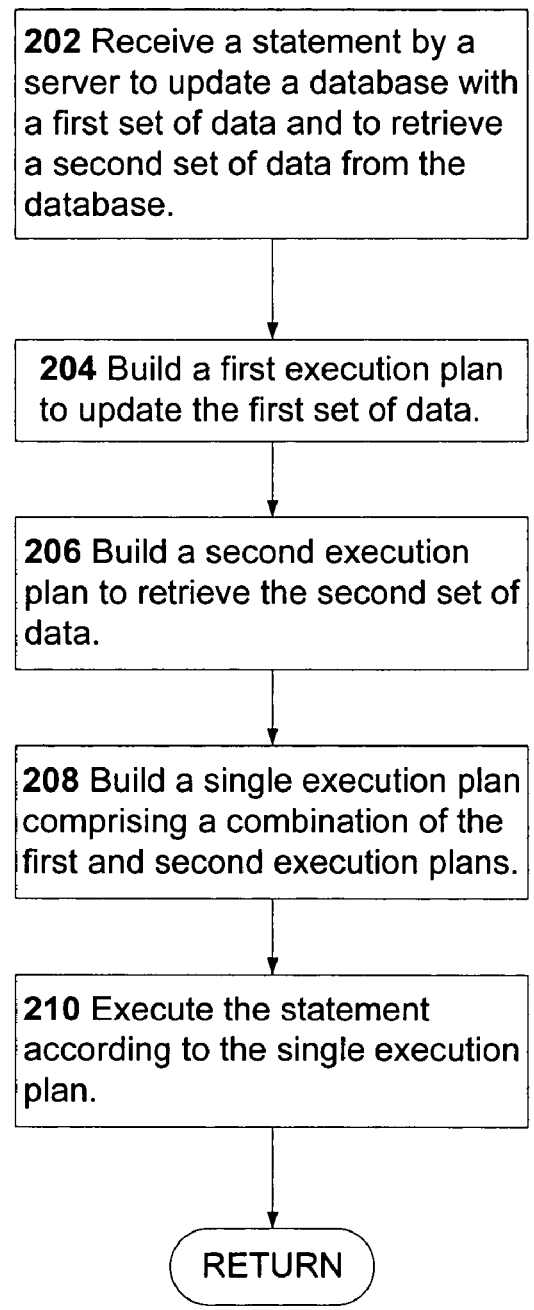
FIG. 2 is a flowchart illustrating a preferred embodiment of a method for generating an execution plan for updating and retrieving data from a database in a single process in accordance with the present invention.

FIG. 2 is a flowchart illustrating a preferred embodiment of a method for generating an execution plan for updating and retrieving data from a database in a single process in accordance with the present invention. First, the server 104 receives a statement to update the database 108 with a first set of data and to retrieve a second set of data from the database 108, via step 202. The statement can be from an application 102 at a client 101 or be received locally at the server 104. The second, retrieved set of data can be the same rows involved in the first, updated set of data, or it can be more or less than the first set of data. Once the statement is received, a first execution plan to update the database 108 with the first set of data is built, via step 204. Then, a second execution plan to retrieve the second set of data is built, via step 206. Next, a single execution plan comprising a combination of the first and second execution plans is built, via step 208. In the preferred embodiment, as the single execution plan is being built, storage for each of the data in the second set of data can be obtained. The statement is then executed according to this single execution plan, via step 210. The building of the single execution plan is an important aspect of the present invention. It sets forth how the query processor 106 would update the first set of data and retrieve the second set of data with a single crossing of the data manager 107. By performing both functions in this manner, the efficiency of performing such tasks on the database 108 is significantly increased.

In the preferred embodiment, SQL is used to perform tasks on the database 108. A single SQL statement, with the syntax, SELECT . . . FROM FINAL TABLE (INSERT . . . ) is used to issue an update and a retrieval of data of the database 108 in a single process. However, other types of statements with different syntax can also be used without departing from the spirit and scope of the present invention.

For example, assume that the following SQL statement was issued to the server 104:

SELECT C1, C2, C3 FROM FINAL TABLE (INSERT into T1 (C1, C2) VALUES (:hv1, :hv2))

This SQL statement requests that the values of the variables, hv1 and hv2, be inserted into columns C1 and C2 in table T1. After updating the table T1, the actual values stored in columns C1, C2, and C3 are to be retrieved from the table T1.

Figure 3:
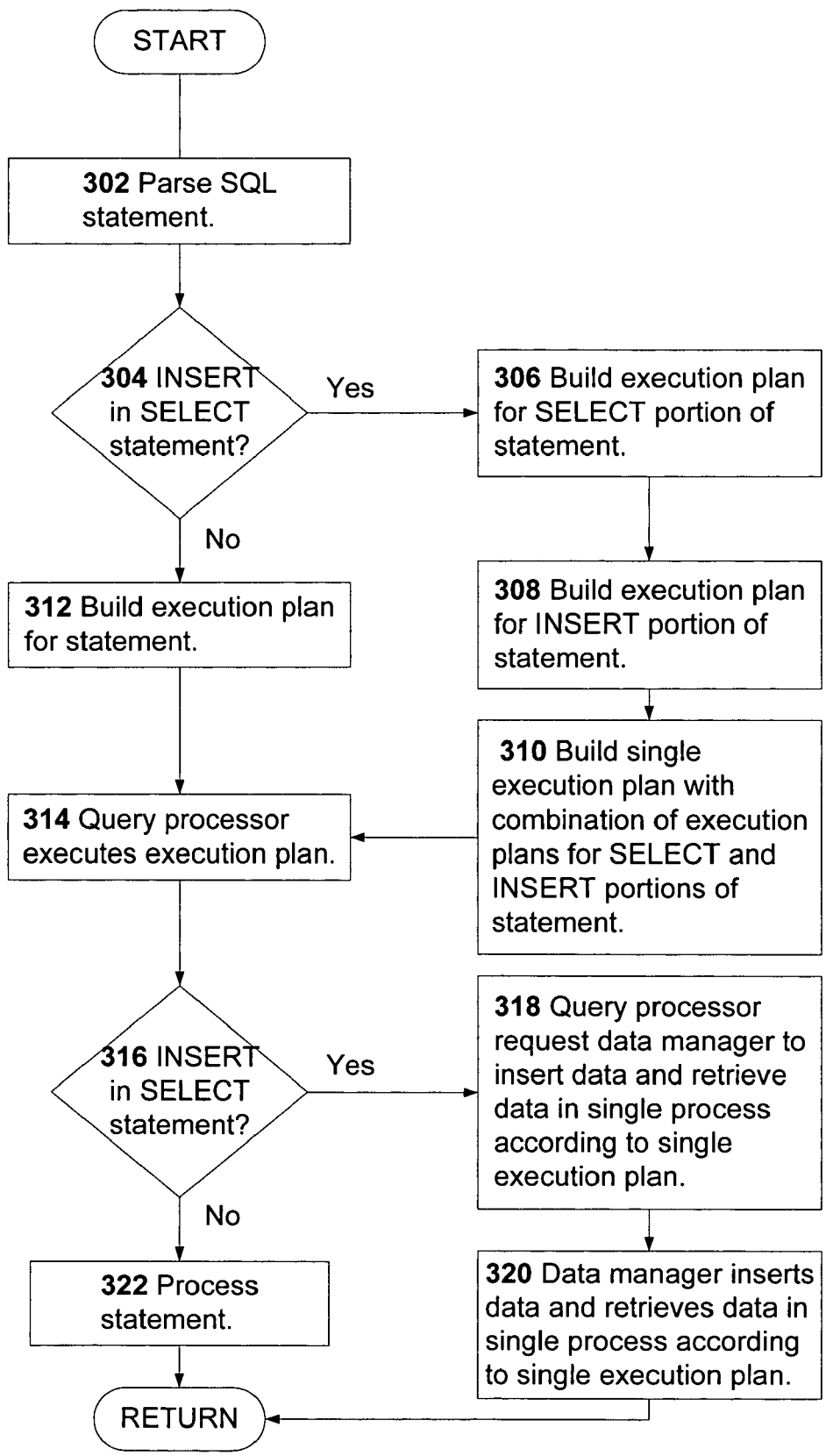
FIG. 3 is a flowchart illustrating the method for generating an execution plan for updating and retrieving data from a database in a single process in a Structured Query Language context.

To illustrate the execution of this SQL statement in accordance with the present invention, please refer to FIG. 3. FIG. 3 is a flowchart illustrating the method for generating an execution plan for updating and retrieving data from a database in a single process in a SQL context. When the server 104 receives the SQL statement above, the query processor 106 first parses the SQL statement, via step 302. If the SQL statement is determined to not be an INSERT in a SELECT statement, via step 304, then an execution plan for the SQL statement is built in a conventional manner, via step 312. However, with the example SQL statement above, the SQL statement is an INSERT in a SELECT statement. Thus, the query processor 106 dismantles the SELECT portion of the statement from the INSERT portion of the statement. An execution plan for the SELECT portion of the statement is then built, via step 306. An execution plan for the INSERT portion of the statement is also built, via step 308. Both the execution plans for the SELECT and INSERT portions can be built in a conventional manner. Next, a single execution plan with the combination of the executions plans for the SELECT and INSERT portions of the statement is built, via step 310.

The query processor 106 then executes the single execution plan, via step 314. If the SQL statement was not an INSERT in a SELECT statement, via step 316, then the SQL statement is processed, via step 322, according to the execution plan conventionally created in step 312. Since the example SQL statement is an INSERT in a SELECT statement, then the query processor 106 sends a request to the data manager 107, via step 318, to insert data and retrieve the data in a single process according to the single execution plan created in step 310. The data manager 107 then executes the single execution plan, via step 320. Thus, only one crossing of the API between the query processor 106 and the data manager 107 is required to both update and retrieve data from the database 108.

For the example SQL statement above, the data manager 107 inserts the values of hv1 and hv2 in columns C1 and C2 of table T1. In doing so, the data manager 107 has a pointer to the row with these new values. Then, using the same pointer, the data manager 107 fetches the actual data in columns, C1, C2, and C3, in the table T1. This data is then returned to the application that issued the SQL statement.

Figure 4:
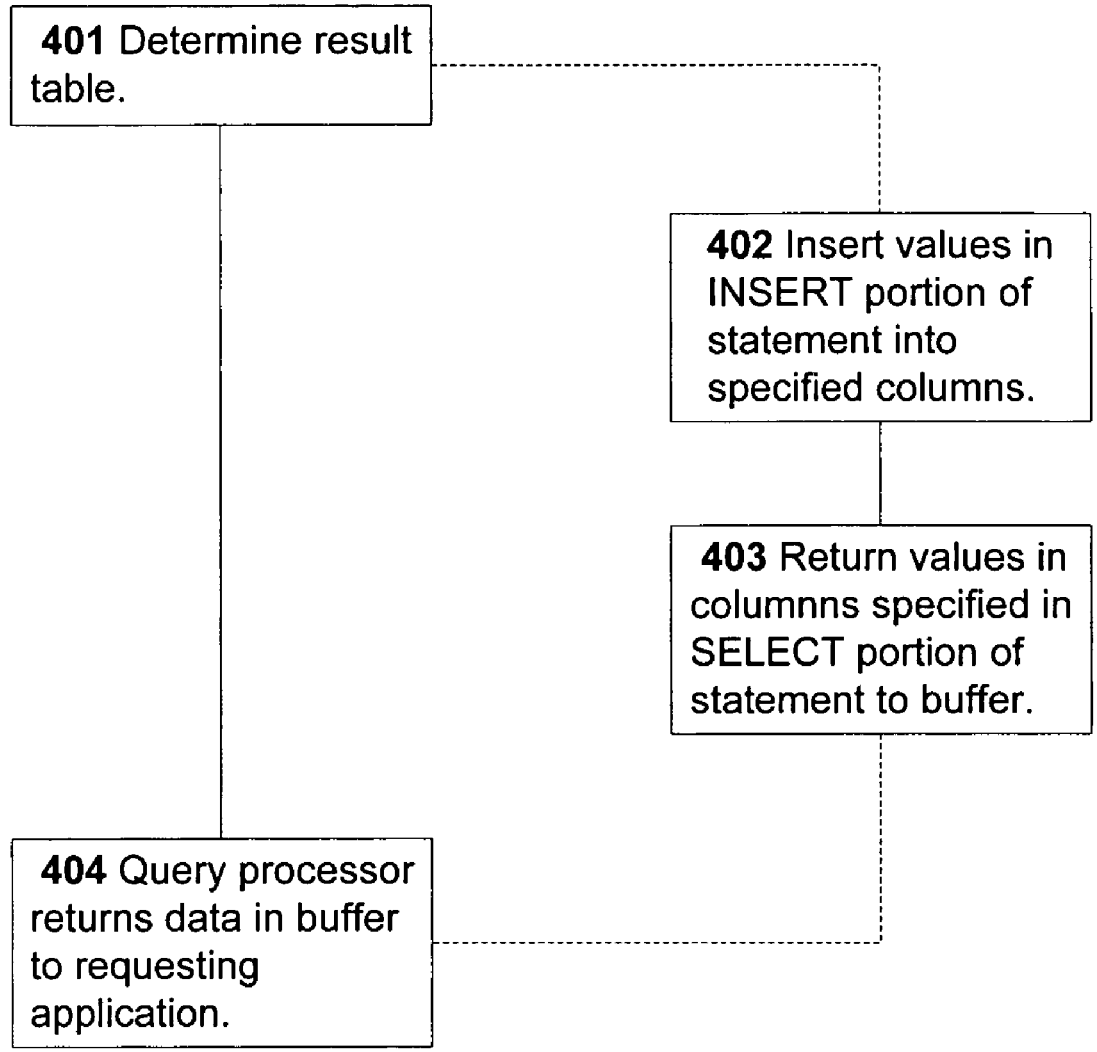
FIG. 4 is a flowchart illustrating in more detail the execution of the single execution plan for an example SQL statement.

FIG. 4 is a flowchart illustrating in more detail the execution of the single execution plan for the example SQL statement. First, the result table for the example SQL statement is determined, via step 401. To determine the result table, the data manager 107 first inserts the values of the host variables, hv1 and hv2, from buffers into the columns, C1 and C2, specified in the INSERT portion of the statement, via step 402. The buffers would have been created during the creation of the execution plan. Then, the data manager 107 returns the values in the columns, C1, C2, and C3, specified in the SELECT portion of the statement to the buffers, via step 403. Once the result table is determined in this manner, the query processor 106 returns the data in the buffers to the requesting application, via step 404.

In addition to updating and retrieving data, other database capabilities can also be made available through the method in accordance with the present invention. For example, the filtering and sorting of data can be used. In the SQL context, predicates, cursors, subselects, and ordered by functionalities can be made available. In fact, the full capabilities of SQL can be offered.

Figure 5:
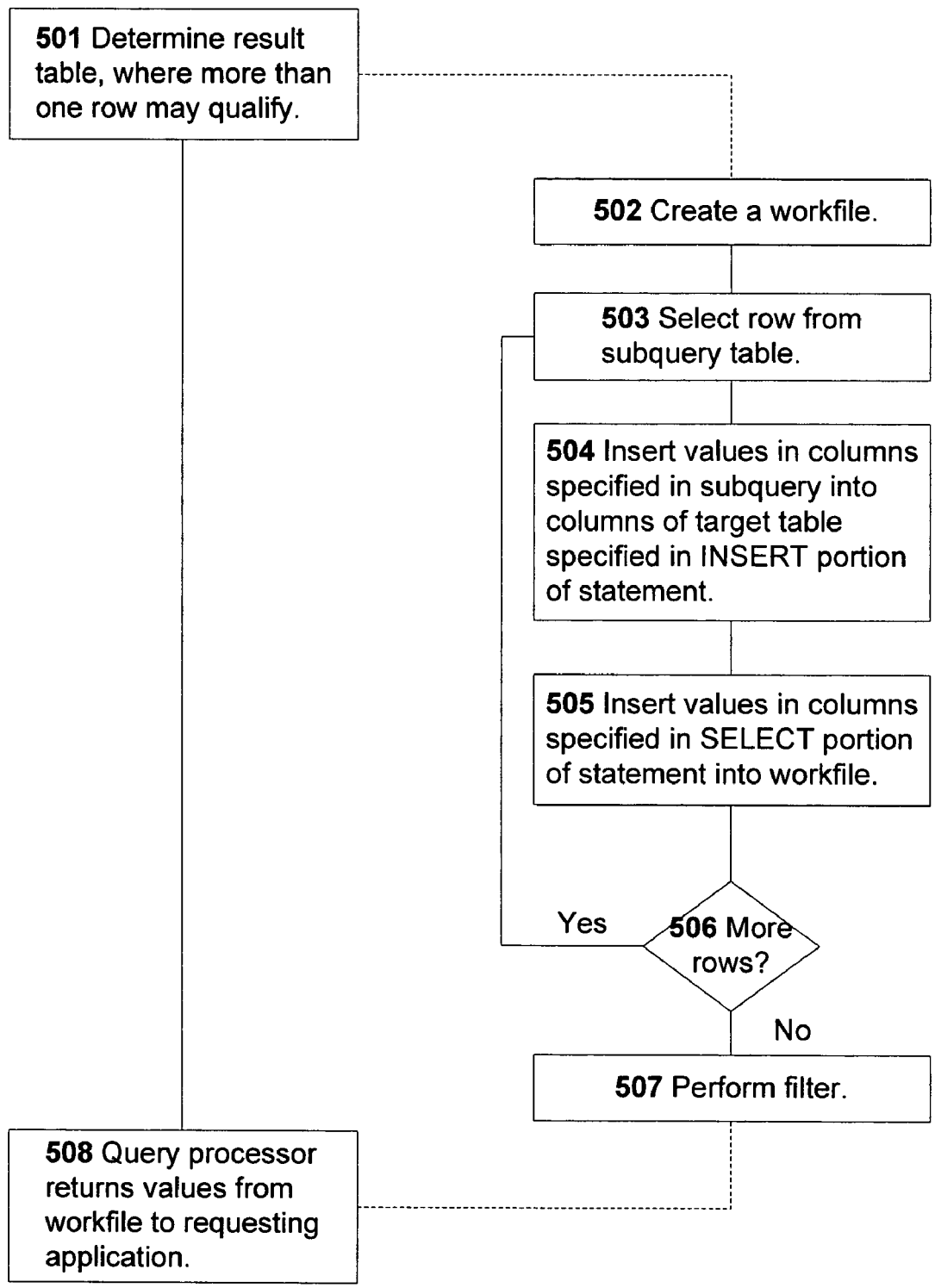
FIG. 5 is a flowchart illustrating the execution of the single execution plan for a second example SQL statement.

Consider a second example SQL statement:
DECLARE CS1 CURSOR FOR
SELECT C1, C2, C3 FROM FINAL TABLE
(INSERT into TI(C1, C2)
  (SELECT C4, C5 FROM Stuff))
WHERE Numstuff>:hv3;

A single execution plan is built for the second example SQL statement according to steps 302 through 304, as described above in FIG. 3. FIG. 5 is a flowchart illustrating the execution of the single execution plan for the second example SQL statement. First, the result table is determined, via step 501, where more than one row may qualify. To determine the result table, first, a workfile is created, via step 502. Then, a row containing the columns, C4 and C5, specified in the subquery, is selected from the subquery table, Stuff, via step 503. The values of these columns, C4 and C5, are then inserted into the target table, T1, in the columns, C1 and C2, specified in the INSERT portion of the statement, via step 504. The values of the columns, C1, C2, and C3, specified in the SELECT portion of the statement are then inserted into the workfile, via step 505. Here, while the values of columns C1 and C2 are updated, the value of column C3 is also returned, along with the updated values of columns C1 and C2. If more rows quality, via step 506, then steps 503 through 505 are repeated for each row. Once all qualifying rows are processed, the filter is performed, via step 507. For the second example SQL statement above, all values in the workfile where Numstuff is greater than the value of the host variable, hv3, are retained. Once the results table is determined in this manner, the query processor 106 returns the values from the workfile to the requesting application, via step 508.

Figure 6:
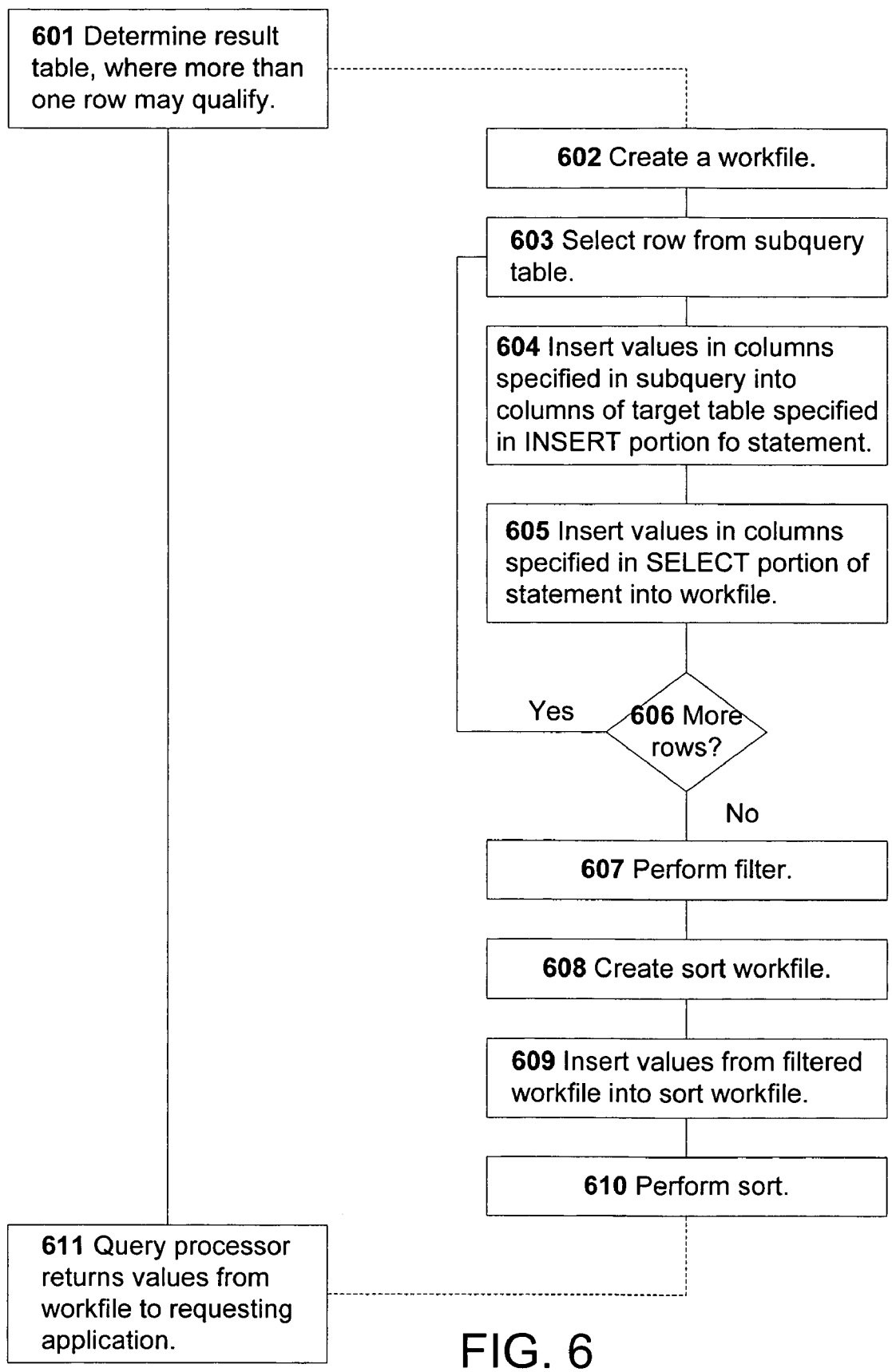
FIG. 6 is a flowchart illustrating the execution of the single execution plan for a third example SQL statement.

Consider a third example SQL statement:
DECLARE CS1 CURSOR FOR
SELECT C1, C2, C3 FROM FINAL TABLE
(INSERT into TI(C1, C2)
  (SELECT C4, C5 FROM Stuff))
WHERE Numstuff>:hv3
ORDER BY C2;

A single execution plan is built for the third example SQL statement according to steps 302 through 314, as described above in FIG. 3. FIG. 6 is a flowchart illustrating the execution of the single execution plan for the third example SQL statement. First, the result table is determined, via step 601, where more than one row may qualify. To determine the result table, first, a workfile is created, via step 602. Then, a row containing the columns, C4 and C5, specified in the subquery is selected from the subquery table, Stuff, via step 603. The values of these columns, C4 and C5, are then inserted into the target table, T1, in columns, C1 and C2, specified in the INSERT portion of the statement, via step 604. The values of the columns, C1, C2, and C3, specified in the SELECT portion of the statement are then inserted into the workfile, via step 605. If more rows quality, via step 606, then steps 603 through 605 are repeated for each row. Once all qualifying rows are processed, the filter is performed, via step 607. For the third example SQL statement above, all values in the workfile where Numstuff is greater than the value of the host variable, hv3, are retained. Next, a sort workfile is created, via step 608. The values from the filtered workfile is inserted into the sort workfile, via step 609. The sort is then performed, via step 610. According to the ORDER BY portion of the third example SQL statement, the values in the sort workfile are sorted according to the values in the column, C2. Once the results table is determined in this manner, the query processor 106 returns the values from the sort workfile to the requesting application, via step 611.

Figure 7:
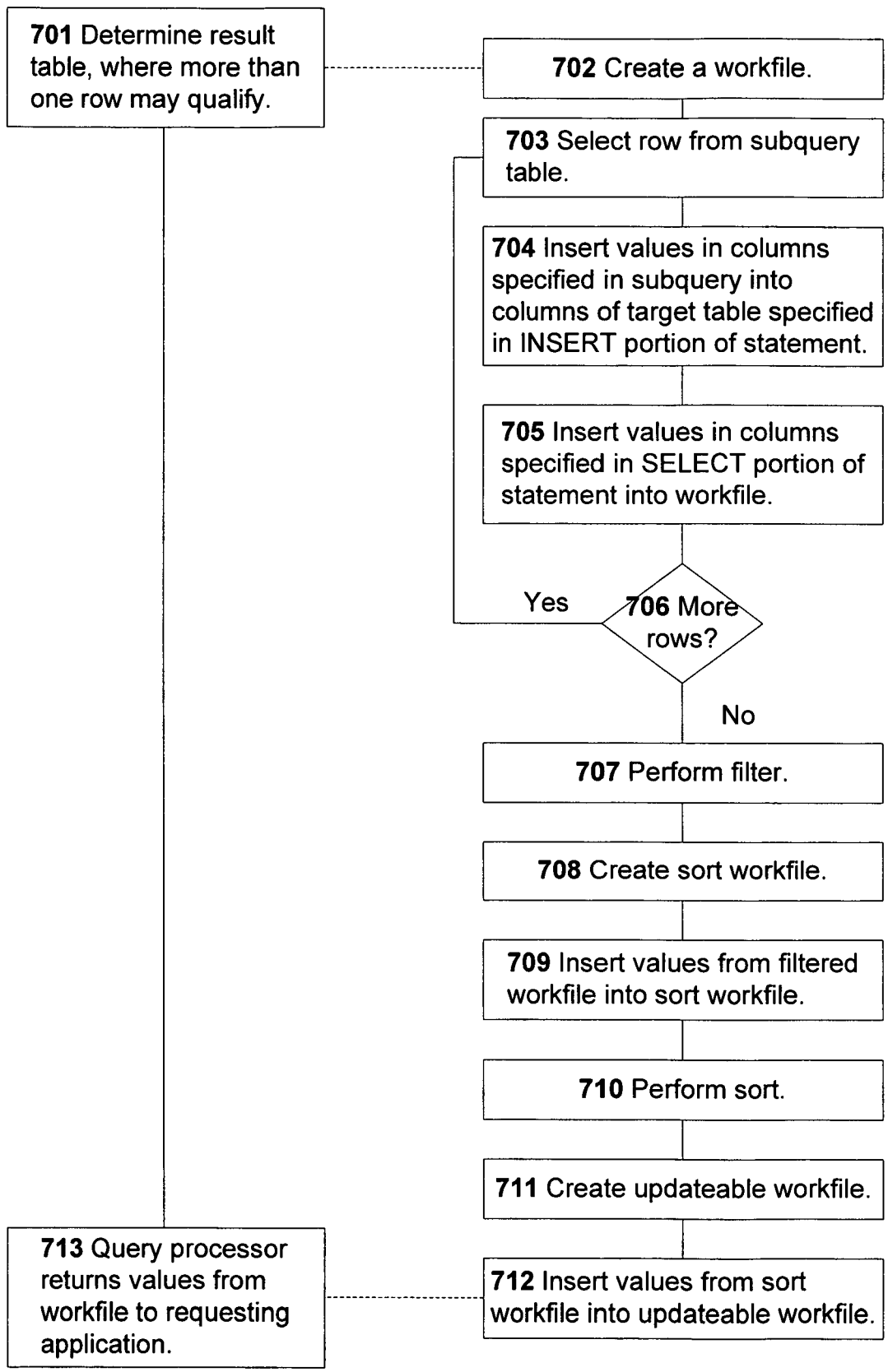
FIG. 7 is a flowchart illustrating the execution of the single execution plan for a fourth example SQL statement.

Consider a fourth example SQL statement:
DECLARE CS1 INSENSITIVE SCROLL CURSOR FOR
SELECT C1, C2, C3 FROM FINAL TABLE
(INSERT into TI(C1, C2)
  (SELECT C4, C5 FROM Stuff))
WHERE Numstuff>:hv3
ORDER BY C2;

A single execution plan is built for the fourth example SQL statement according to steps 302 through 314, as described above in FIG. 3. FIG. 7 is a flowchart illustrating the execution of the single execution plan for the fourth example SQL statement. First, the result table is determined, via step 701, where more than one row may qualify. To determine the result table, first, a workfile is created, via step 702. Then, a row containing the columns, C4 and C5, specified in the subquery is selected from the subquery table, Stuff, via step 703. The values of these columns, C4 and C5, are then inserted into the target table, T1, in the columns, C1 and C2, specified in the INSERT portion of the statement, via step 704. The values of the columns, C1, C2, and C3, specified in the SELECT portion of the statement are then inserted into the workfile, via step 705. If more rows quality, via step 706, then steps 703 through 705 are repeated for each row. Once all qualifying rows are processed, the filter is performed, via step 707. For the fourth example SQL statement above, all values in the workfile where Numstuff is greater than the value of the host variable, hv3, are retained. Next, a sort workfile is created, via step 708. The values from the filtered workfile are inserted into the sort workfile, via step 709. The sort is then performed, via step 710. According the ORDER BY portion of the statement, the values in the sort workfile are sorted according to the values in the column, C2. Next, an updateable workfile is created, via step 711. The values from the sort workfile are then inserted into the updateable workfile, via step 712. Once the results table is determined in this manner, the query processor 106 returns the values from the updateable workfile to the requesting application, via step 713.

When the database system is a distributed database system, during processing of any of the example SQL statements above, the server 104 additionally returns an indicator that data has been updated in the database 108. This indicator is important for commit transaction processing, as the requester needs to know if any updates occurred, and if so, to commit the changes. If no updates were made, then no commit processing is needed.

The method in accordance with the present invention takes advantage of new database inter-component communications. The query processor 106 executes the SQL statement while the data manager 107 component manipulates the data. Thus, the query processor 106 tells the data manager 107 what to do. With the present invention, this inter-component communication is minimized by having the query processor 106 inform the data manager 107 to update data and retrieve data at the same time, i.e., with one crossing of the API between the query processor 106 and the data manager 107. Execution costs are saved by not calling the API a second time to retrieve the values.

A method for generating an execution plan for updating and retrieving data from a database in a single process has been disclosed. The method builds a single, combined execution plan for updating and retrieving data with a single crossing of the API between the client and the database. By performing both functions in this manner, the efficiency of performing such tasks on the database is significantly increased. A single statement can be used to perform both functions. If errors occur in retrieving the data, the insertion of data is not necessarily affected. In addition, the full capabilities of database, such as the filtering and sorting of data, can be made available.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A computer-implemented method for generating a single execution plan for updating and retrieving data from a database in a single process, the method comprising:

receiving and storing a statement by a server to both update the database with a first set of data and retrieve a second set of data from the database, wherein receiving the statement by the server comprises receiving a single statement comprising a first portion to update the database with the first set of data and a second portion to retrieve the second set of data from the database;

parsing the statement into the first portion corresponding to the update of the database with the first set of data and the second portion corresponding to the retrieval of the second set of data from the database;

building a first execution plan for the first portion of the statement to update the database with the first set of data;

building a second execution plan for the second portion of the statement to retrieve the second set of data from the database;

building the single execution plan comprising a combination of both the first execution plan and the second execution plan;

executing the single execution plan derived from the single statement to update and retrieve, wherein the database is updated with the first set of data and the second set of data is retrieved from the database in said single process, the first set of data comprising at least one or more different rows of data in relation to the second set of data, and being independent from the second set of data; and displaying the second set of data received from the database to a user.

2. The method of claim 1, wherein the single execution plan is executed with a single crossing of an interface between a client and the database.

3. The method of claim 1, wherein a set of rows in the database is updated with the first set of data.

4. The method of claim 3, wherein the second set of data is retrieved from at least one column in the set of rows in the database, from the at least one column in more rows than the set of rows in the database, or from the at least one column in less rows than the set of rows in the database.

5. The method of claim 1, wherein the second set of data is filtered or sorted.

6. The method of claim 1, wherein parsing the statement occurs prior to building of the first execution plan and prior to building of the second execution plan.

7. The method of claim 1, further comprising subsequent to executing the single statement, receiving an indicator that data has been updated in the database, the database comprising a distributed database system.

8. A system to generate a single execution plan for updating and retrieving data from a database in a single process, the system comprising:
   a database;
   a server, coupled in communication with the database, the server configured to:
      receive and store a statement to both update the database with a first set of data and retrieve a second set of data from the database, wherein the statement is a single statement comprising a first portion to update the database with the first set of data and a second portion to retrieve the second set of data from the database, the server configured to parse the statement into the first portion corresponding to the update of the database with the first set of data and the second portion corresponding to the retrieval of the second set of data from the database;
      build a first execution plan for the first portion of the statement to update the database with the first set of data;
      build a second execution plan for the second portion of the statement to retrieve the second set of data from the database;
      build the single execution plan comprising a combination of both the first execution plan and the second execution plan; and
      execute the single execution plan derived from the single statement to update and retrieve, wherein the database is updated with the first set of data and the second set of data is retrieved from the database in said single process, the first set of data comprising at least one or more different rows of data in relation to the second set of data, and being independent from the second set of data; and
   a display to display the second set of data received from the database to a user.

9. The system of claim 8, wherein the single execution plan is executed with a single crossing of an interface between a client and the database.

10. The system of claim 8, wherein a set of rows in the database is updated with the first set of data.

11. The system of claim 10, wherein the second set of data is retrieved from at least one column in the set of rows in the database, from the at least one column in more rows than the set of rows in the database, or from the at least one column in less rows than the set of rows in the database.

12. The system of claim 8 wherein the second set of data is filtered or sorted.

13. The system of claim 8, wherein parsing the statement occurs prior to building of the first execution plan and prior to building of the second execution plan.

14. A computer readable medium comprising program instructions for implementing a method for generating a single execution plan for updating and retrieving data from a database in a single process, the method comprising:
   receiving and storing a statement by a server to both update the database with a first set of data and retrieve a second set of data from the database, wherein receiving the statement by the server comprises receiving a single statement comprising a first portion to update the database with the first set of data and a second portion to retrieve the second set of data from the database;
   parsing the statement into the first portion corresponding to the update of the database with the first set of data and the second portion corresponding to the retrieval of the second set of data from the database;
   building a first execution plan for the first portion of the statement to update the database with the first set of data;
   building a second execution plan for the second portion of the statement to retrieve the second set of data from the database;
   building the single execution plan comprising a combination of both the first execution plan and the second execution plan;
   executing the single execution plan derived from the single statement to update and retrieve, wherein the database is updated with the first set of data and the second set of data is retrieved from the database in said single process, the first set of data comprising at least one or more different rows of data in relation to the second set of data, and being independent from the second set of data; and
   displaying the second set of data received from the database to a user.

15. The computer readable medium of claim 14, wherein the single execution plan is executed with a single crossing of an interface between a client and the database.

16. The computer readable medium of claim 14, wherein a set of rows in the database is updated with the first set of data.

17. The computer readable medium of claim 16, wherein the second set of data is retrieved from at least one column in the set of rows in the database, from the at least one column in more rows than the set of rows in the database, or from the at least one column in less rows than the set of rows in the database.

18. The computer readable medium of claim 14, wherein the second set of data is filtered or sorted.

19. The computer readable medium of claim 14, wherein parsing the statement occurs prior to building of the first execution plan and prior to building of the second execution plan.

20. The computer readable medium of claim 14, further comprising subsequent to executing the single statement, receiving an indicator that data has been updated in the database, the database comprising a distributed database system.

21. The method of claim 1, wherein building the single execution plan comprises the server building the single execution plan comprising a combination of both the first execution plan and the second execution plan.

22. The method of claim 1, wherein building the single execution plan comprises the server building the single execution plan comprising a combination of both the first execution plan and the second execution plan.

23. The method of claim 1, wherein an execution plan comprises an outline of how the server will actually run a specific query or statement.

* * * * *